United States Patent [19]

Johansson

[11] 3,852,026
[45] Dec. 3, 1974

[54] METHOD OF HEATING GOODS AND A HEATING FURNACE

[75] Inventor: Folke Johansson, Vasteras, Sweden

[73] Assignee: Granges Engineering Aktiebolag, Vasteras, Sweden

[22] Filed: Nov. 1, 1973

[21] Appl. No.: 411,813

[30] Foreign Application Priority Data
Nov. 6, 1972 Sweden.................... 14354/72

[52] U.S. Cl..................... 432/23, 432/200
[51] Int. Cl..................... F27b 11/06
[58] Field of Search.......... 432/23, 24, 38, 48, 198, 432/200, 242

[56] References Cited
UNITED STATES PATENTS
| | | | |
|---|---|---|---|
| 2,191,133 | 2/1940 | Pearson | 432/23 |
| 2,253,897 | 8/1941 | Doderer | 432/23 |
| 3,431,346 | 3/1969 | Western et al. | 432/242 |
| 3,447,788 | 6/1969 | Bornor | 432/242 |

*Primary Examiner*—John J. Camby
*Attorney, Agent, or Firm*—Waters, Roditi, Schwartz & Nissen

[57] ABSTRACT

A method and apparatus for use when heating or heat treating goods whose surfaces tend to react chemically with the surrounding atmosphere when subjected to heat. There is used a furnace which is heated without the combustion of fuel in the actual furnace space thereof. A controlled furnace atmosphere suitable for the material in question is maintained by supplying the furnace substantially continuously with a gas having a controlled composition. The goods are fed into and of the furnace through at least one gas-flushed lock-type feed valve. The gas used to maintain the controlled atmosphere in the furnace is passed substantially continuously from the furnace to a gas storage device, from which it is passed intermittently to the feed valve to flush the same. The gas passed from the furnace to the storage device is compressed during its passage thereto and the feed valve is preferably evacuated prior to being flushed with said gas.

6 Claims, 1 Drawing Figure

PATENTED DEC 3 1974　　　　　　　　　　　　　　3,852,026
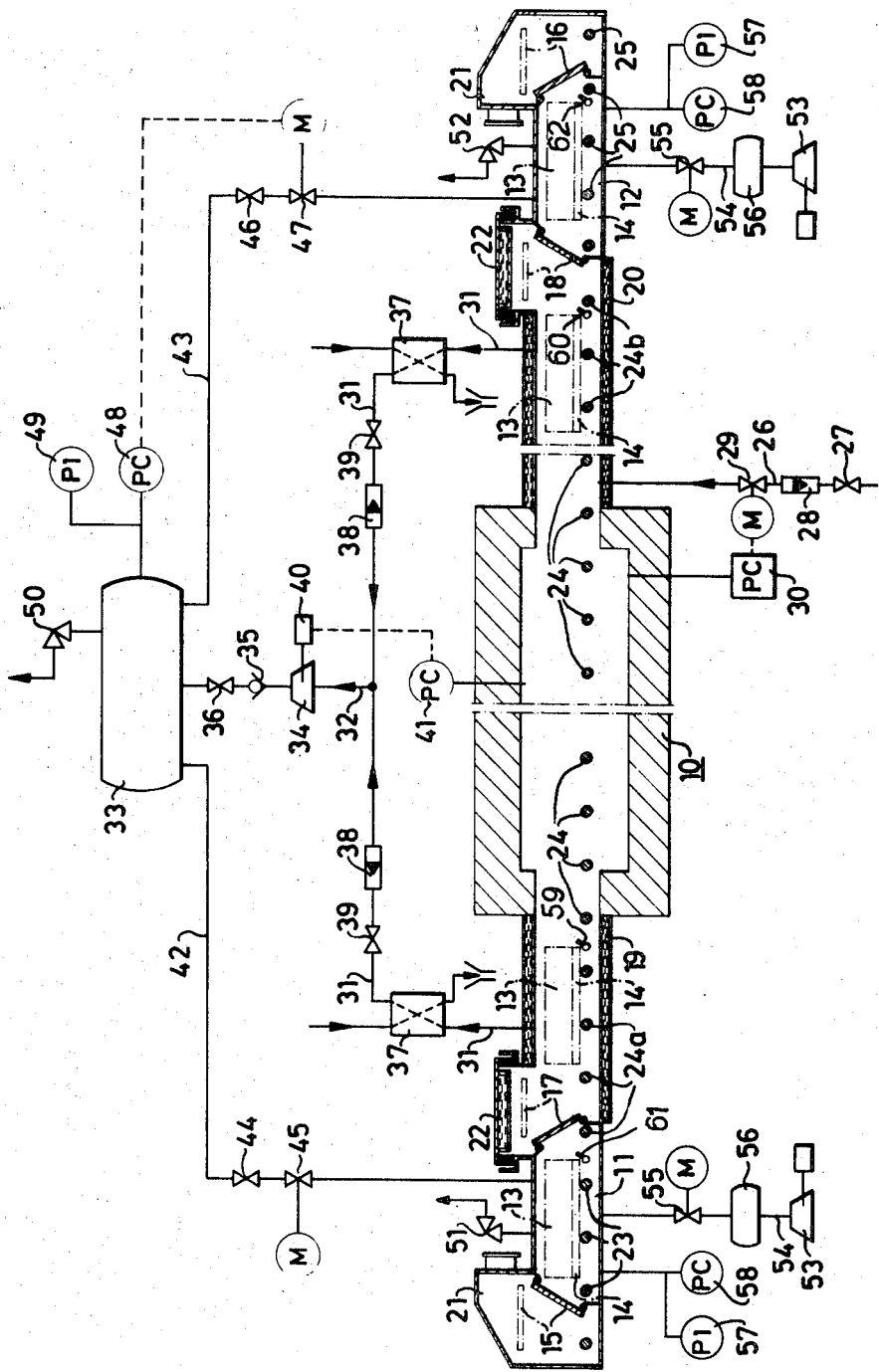

METHOD OF HEATING GOODS AND A HEATING FURNACE

The present invention relates to a method for heating or heat treating material in a furnace of the type which is not heated by combusting fuel in the furnace space itself, and wherein the surfaces of the material tend to react chemically with the surrounding atmosphere when subjected to heat, in which method a controlled atmosphere which is suitable for the material being treated is maintained in the furnace by supplying, substantially constantly thereto a gas having a controlled composition, the material being fed into and out of the furnace through at least one gas-flushed lock-type feed valve. The invention also relates to a furnace system for carrying out the method.

When heating and heat-treating material whose surfaces tend to react chemically with the furnace atmosphere when subjected to heat in a furnace, it is conventional practise to maintain in the furnace an atmosphere which is favorable to the material in question, by supplying to the furnace a protective or process gas, and to feed the material into and out of the furnace through sealing curtains or gas-flushed lock-type feed valves. As a rule, the use of sealing curtains can only be applied with straight rods and pipes and similar elongate objects having a cross section which does not appreciably change along the length thereof. This greatly restricts the useability of sealing curtains for the envisaged purpose. Moreover, when using sealing curtains, large quantities of gas must be charged to the furnace to prevent dilution of the furnace atmosphere with air from the surroundings, which makes it necessary to provide relatively large and expensive devices for supplying the protective or process gas, and incurs high operational costs. Lock-tye feed valves are dependent on the configuration of the furnace charge to a far lesser extent than the sealing curtains, but are encumbered with the disadvantage whereby the gas flow required periodically to flush the feed valves is greater than that required to maintain the desired atmosphere in the furnace, unless it can be tolerated that the goods to be treated are locked very slowly through the feed valve, the term "locked" as used here in defining the sequence of feeding goods into and out of a lock-type feed valve. This would greatly lower the capacity of the furnace, however, consequently, when using lock-type feed valves it is necessary in practise to over-dimension the protective gas or process gas supply devices in relation to the gas requirement of the actual furnace, thereby rendering the furnace system itself and the operation thereof more expensive.

An object of the invention is to provide a novel and useful method and a novel and useful furnace system with which the material to be heated or heat treated is fed, via lock-type feed valves, into and out of a furnace in which there is maintained a controlled atmosphere, and which method and furnace system are not encumbered with the aforementioned disadvantages.

To this end there is provided a method of the type and which method in accordance with the present invention is mainly characterized in that the gas used for maintaining the controlled atmosphere in the furnace is passed substantially continuously from the furnace to a magazine, from which it is intermittently passed to said at least one lock-type feed valve for flushing the same. In accordance with the invention, the relatively small quantity of gas per unit of time passed continuously through the furnace is collected in a magazine, from which it is passed as required to the lock-type feed valve or valves for flushing the same in the necessary, relatively large quantities per unit of time. By accumulating the gas already used in the furnace to maintain the desired atmosphere therein in a magazine, the necessity of dimensioning the gas supply devices or gas generation devices to conform to the relatively large gas flows required for the lock-type valve flushing sequences is at least substantially eliminated.

The furnace system proposed in accordance with the invention for carrying out the method of the invention when heating or heat treating material whose surfaces tend to react chemically with the surrounding atmosphere when subjected to heat comprises a furnace having at least one lock-type feed valve for feeding or locking the material into and out of the furnace, regulatable gas supply means for substantially continuously supplying gas to the furnace abd means for controllably flushing the lock-type feed valve with gas at intervals, the furnace system being mainly characterized in that it further comprises a gas magazine, means for substantially continuously passing gas from the furnace to the magazine and means for intermittently passing gas from the magazine to the lock-type feed valve.

The invention will now be described in more detail with reference to a furnace system according to the invention diagrammatically shown in the sole Figure of the accompanying drawing, further features of the invention being disclosed in connection therewith.

The drawing shows in vertical axial section a furnace 10 which is heated without combusting fuel in the actual furnace space thereof. The furnace 10, which is assumed to be heated by means of electric resistance elements (not shown), is a through-feed type furnace joined at either end thereof to lock-type feed valves 11, 12 for feeding or locking goods 13 to be heat treated into and out of the furnace. The goods 13, which with the illustrated embodiment are assumed to comprise open-ended loops or coils of iron tubing, which is to be annealed in the furnace without being subjected to decarbonization and scaling, rest on perforated support plates 14, which together with the goods 13 are fed substantially continuously through the furnace. The lock-type feed valves 11, 12 are provided with outer feed valve flaps 15 and 16 respectively and inner feed valve flaps 17 and 18 respectively and are joined to the furnace itself via zones 19 and 20 which are cooled by a circulating coolant, and which may have the form of water-jacketed zones for example, thereby preventing overheating of the inner feed valve flaps 17, 18 and the opening and closing machinery associated therewith. The zone 20 connected to the discharge feed valve 12 may have a length such that the heat-treated goods 13 are able to cool before leaving the furnace system via the feed valve 12. The feed valve flaps 15–18 are pivoted at the upper edge theref to permit the flaps to be swung from a furnace closing and sealing position, as shown in full lines in the drawing, to an open position, as shown in chain lines. Gas collecting hoods 21 are arranged around the outer feed valve flaps 15, 16 and gas-tight covers 22 permit access to the inner feed valve flaps 17, 18. The furnace hearth and the goods surfaces supporting in zones 19, 20 and the goods supporting surfaces located in and immediately outside the feed valves 11, 12 comprise a roller path consisting of rollers 23, 24a, 24, 24b, 25. The axles of rollers 23–25 extend gas-sealingly through the side walls of members 10, 11, 12, 19, 20 and are journalled externally of said members. At least some of the rollers 23–25 are driven. For reasons hereinafter mentioned, the rollers 24a in zone 19 are capable of being driven either in unison with rollers 23 at a relatively high rotary speed or in unison with rollers 24 at a relatively low rotary speed. Similarly, the rollers 24b are capable of being driven either in unison with rollers 25 at a relatively high speed or in unison with rollers 24 at a relatively low speed.

When heat treating goods 13 in the furnace 10, a protective gas is passed to the furnace through a pipe 26, from a protective gas manufacturing device (not shown). Arranged in the pipe 26 is a shut-off and setting valve 27, a flow meter 28 and a motor valve 29 which, in a known manner and as indicated with a chain line in the drawing, is controlled via a pressure regulator 30 arranged to sense the pressure in the furnace, so that the pressure in the furnace is maintained at a desired, substantially constant level, for example at a gage pressure of approximately 10 mm of water. It may be convenient to introduce the protective gas in the shown manner at the beginning of zone 20, when said zone forms a cooling zone for goods 13, since in this way the protective gas flowing into the actual furnace 10 will be pre-heated by heat-given off by the goods as they cool in said zone.

The protective gas used in the furnace is discharged therefrom via pipes 31 at positions located adjacent the inner feed valve flaps 17, 18, the pipes 31 discharging into a common pipe 32, connected to a gas magazine 33, said magazine in the exemplary embodiment having the form of a pressure vessel. Arranged in the pipe 32 is a pump or compressor 34 which sucks gas from the furnace and feeds the gas in a compressed state to the magazine 33 via a check valve 35 and a normally open shut-off valve 36. Arranged in each pipe 31 is a cooling means 37 for indirect cooling of the gas removed from the furnace to a temperature suitable for the compressor and working with a circulating coolant for example, a flow meter 38 and a setting valve 39 by means of which the desired gas flow in the pipe 31 in question can be set. The compressor 34 is driven by an electric motor 40. A known pressure regulator 41 arranged to sense the pressure in the furnace 10 is adapted to break the current to the compressor motor 40 if the pressure in the furnace falls beneath a predetermined minimum value.

Pipes 42, 43 extend from the magazine 33 to the lock-type feed valves 11, 12. Arranged in the pipe 42 is a normally open, manually adjustable valve 44 and a time-controlled motor valve 45 which is only open for a certain period of time during each locking sequence of the goods through the infeed lock-type feed valve. Similarly, a normally open, manual setting valve 46 and a motor valve 47 are arranged in pipe 43. As opposed to motor valve 45, the valve 47 is not time controlled but closing of the valve is controlled via a regulator 48 which is arranged to sense the pressure in the magazine 33 and to close said valve 47 when the pressure in said magazine has fallen to a pre-determined level. The pressure in the magazine 33 may also be read on a pressure indicator 49, and a biassed safety valve 50 is arranged to release gas from the magazine 33 when the pressure therein exceeds a pre-determined maximum value. Gas supplied via pipes 42 and 43 to the lock-type feed valves 11, 12 for flushing the same departs through biassed overflow valves 51, 52 when the pressure in the feed valves exceeds a pre-determined value.

As previously mentioned, the goods 13 treated in the illustrative furnace system are assumed to be in the form of tubular coils. It will readily be perceived that air contained within the coils cannot be totally flushed therefrom in the feed valve 11, even though very large quantities of flushing gas should be charged to said valve. Because of this, means are provided for evacuating the air in the feed valve 11 prior to flushing the same with gas. The expedient of evacuating air from the feed valve is also advantageous in respect of goods other than tubular goods locked into and out of the furnace through lock-type feed valves, since the amount of gas required to flush the feed valves clean is greatly reduced thereby. Consequently, the feed-out valve 12 is also provided with means for evacuating air therefrom. The air evacuation means comprise for each feed valve a vacuum pump 53 which is arranged to be continuously driven by a motor and which is connected to its respective feed valve via a pipe 54. Arranged in each pipe 54 is a time-controlled motor valve 55, while arranged between the pump 53 and the valve 55 is an intermediate vessel 56 which is evacuated by the continuously operating vacuum pump when the valve 55 is closed and which rapidly empties its respective feed valve of the major portion of the air content thereof as soon as the valve 55 is open. It lies within the purview of the invention, subsequent to part of the air in feed valves 11 or 12 being initially sucked therefrom as a result of connecting the valve to the intermediate vessel 56, to connect the vacuum pump 53 so that it by-passes the vessel 56 and communicates directly with the feed valve, thereby obtaining a low pressure in the feed valves more rapidly. The pressure in the feed valves 11, 12 can be read on pressure indicators 57 and pressure control means 58 are arranged to produce a visual and-/or acoustic warning signal if the pressure in the feed valves 11, 12 fails to fall to a pre-determined subpressure within a pre-determined period of time during the vacuum pumping periods. The infeed and outfeed locking operations of the goods through the lock-type feed valves are initiated by means of limit switches 59 and 60 respectively, which, for example, are springbiassed to adopt a first position in which a portion of the switches projects above the plane of the roller path, and limit switches 61, 62 are arranged in a manner similar to limit switches 59 and 60, to prevent the goods 13 from engaging the feed valve flaps in a manner hereinafter described.

The state of the furnace system at the end of an infeed locking sequence is that the feed valve flap 15 occupies its closed position and the feed valve flap 17 its open position, while a plate 14 with goods 13 resting thereon has been transported by means of rollers 23 and 24a into zone 19 to a position in which the plate 14 activates switch 59, causing the same to adopt a second position in which said switch initiates the following time-controlled operations and sequence of working steps by means of known control means. The rollers 24a are initially driven at the same relatively low speed as the rollers 24, to slowly move the plate 14 located above the switch 59 into the furnace 10 and the feed valve flap 17 is closed. The feed valve flap 15 is then opened and a new plate 14 having goods 13 resting thereon and being located in a state of readiness outside the feed valve 11 is fed into the valve 11 on an infeed table (not shown) provided with feed rollers. The plate 14 with goods 13 resting theron is thus charged to the feed valve 11 by means of the feed rollers on the infeed table and the rollers 23, which are driven at a relatively high speed. As the lastmentioned plate 14 comes into contact with the switch 61 and moves it out of its first position, in which position said switch projects above the plane of the roller path, rotation of the rollers 23 is interrupted and the locking sequence of the goods through lock-type feed valve 11 initiated by the switch 59 is caused to continue by automatically closing the flap 15, whereuponn the motor valve 55 is opened and maintains the inner space of the feed valve in communication with vessel 56 and vacuum pump 53 for a pre-determined period of time, so as to evacuate the air in the feed valve and to create a low pressure of, for example, approximately 10 mm Hg therein. The valve 55 is then closed and the valve 45 opened, so that gas for flushing the feed valve 11 is able to flow from the magazine 33 to and through the feed valve 11 and out therefrom through the valve 51. After a predetermined period of time has passed, the motor valve 45 is closed, whereupon the valve 51 automatically closes when the pressure in the feed valve 11 has dropped to the pressure determined by the bias on valve 51, this pressure to advantage being substantially the same as that in the furnace 10. Subsequent to flushing the feed valve 11 and subsequent to the switch 59 having been released as the preceding plate 14 with goods 13 resting thereon passes beyond said switch, whereupon the switch adopts its first position in which it projects above the plane of the roller path, the flap 17 is opened and the rollers 23 and 24a are driven in unison at a relatively high speed, to move the plate 14 and goods 13 located in the feed valve into contact with switch 59, which therewith starts a new locking sequence of the goods through the feed valve.

At the beginning of the feed-out sequence of the goods through the lock-type feed valve 12, the valve is empty and is flushed with gas and flaps 16 and 18 are closed, the rollers 24b being driven in unison with rollers 24. As a plate 14 with goods 13 resting thereon engages the switch 60 and activates the same, the switch triggers the following time-controlled feed-out operations and sequence of working steps by known control means: opening of flap 18, infeeding of plate 14 with goods 13 resting thereon by driving the rollers 24b and 25 relatively rapidly; stopping the rollers 25 when the plate 14 reaches contact with the switch 62; driving the roller 24b at the same speed as the rollers 24; closing the flap 18; opening the flap 16; feeding out the plate 14 with goods 13 from the feed valve 12; closing the flap 16; placing the feed valve 12 in communication with the vessel 56 and the vacuum pump 53 by opening valve 55; closing the valve 55 and opening the valve 47, which valve 47 is held open until the pressure in the magazine 33 falls to a pre-determined value.

When using the aforedescribed furnace system in practise, a protective gas was charged to the furnace 10 at a flow of 60 Nm$^3$/h (i.e., standard cubic meters at a pressure of 1 atm at 0°C per hour), the valves 39 in the pipes 31 being set to maintain a flow of approximately 30 Nm$^3$/h in each pipe 31. The furnace pressure was maintained at 10 mm of water gauge pressure and the valves 51, 52 were biassed to open at a pressure which exceeded the furnace pressure by only several mm of water. The valve 50 was set to open at a pressure of 13 atm above atmospheric in the magazine 33 and the pressure regulator 48 was set to close the valve 47 at a pressure of 7 atm above atmospheric in the magazine 33. A maximum of 15 locking sequences of the goods through the infeed lock-type feed valves and outfeed lock-type feed valves per hour were carried out, the time during which the valve 45 was open being set so that approximately 2 Nm$^3$ gas was used each time the feed valve 11 was flushed, and hence approximately 30 Nm$^3$ gas was used each hour for flushing the feed valve 11 and the remainder of the gas was used for flushing the feed valve 12. The actual flushing sequence took approximately 1 minute. On those occasions when the infeed and outfeed sequences of the goods through the valves 11 and 12 became so timed in relatin to each other that both feed valves were flushed simultaneously, a gas flow of 4 Nm$^3$/min was required to flush the valves. In the case of a furnace system where the flushing gas is passed directly from the furnace to the feed valves during a feed valve flushing sequence, this would require a protective gas manufacturing device with a capacity of 240 Nm$^3$ protective gas per hour.

The infeed locking frequency of the goods through the lock-type infeed valve may decrease if plates 14 with goods 13 resting thereon are not placed in a state of readiness on the infeed table. In such a case, if the valve 47 were to be time controlled in the same manner as valve 45, an excessively high pressure would be created in the magazine 33 which subsequent release of flushing gas through valve 50 to no purpose. Further, as a result of temperature variations in the magazine 33 and pipes 42, 43 the quantity of gas (calculated to normal state) which flows for a given period of time through the pipes 42 and 43 will vary, which creates a risk of the magazine 33 being emptied or the risk of an excessively high pressure being created therein. It is therefore convenient to control the valve 47 in the aforedescribed manner via a regulator 48 arranged to work in dependence of the pressure in the magazine 33, even though the infeed valve 12 will periodically be flushed with a greater or a slightly smaller amount of gas than that envisaged, i.e., 2Nm$^3$ of gas, each time the goods are locked out of the lock-type outfeed valve 12.

The invention is not restricted to the aforedescribed and illustrated embodiment thereof, but can be modified within the scope of the following claims. Thus, it is not necessary to use a pressure vessel as the gas magazine. For example, the gas can be passed instead from the furnace 10 to a gas holder, from where it can be distributed to the feed valves 11, 12. Further, when the protective gas used in the furnace is an expensive gas and/or when only a small amount of gas is used in the furnace, the evacuation of air from the feed valves 11, 12 can be replaced with or combined with a preflushing of the valves with another, less expensive gas having a composition which is less deleterious to the material being treated than air. The cheaper gas may comprise, for example, flue gases or nitrogen when the furnace system is used in an industry where oxygen-gas manufacturing apparatus are used. Neither is the invention restricted to the type of furnace illustrated. For example, the furnace space may be heated by means of radiation tubes and the goods may be transported through the furnace by means of walking beams or by other appropriate devices instead of rollers, and the furnace may comprise an annular furnace, in which latter case one and the same lock-type feed valve can be used both for infeed locking and outfeed locking of the goods into and out of the furnace respectively.

What is claimed is:

1. A method for the heating of material in a furnace of the type which is heated without combusting fuel in the furnace space itself and having at least one gas-flushed lock-type feed valve for charging and discharging the furnace, which material tends to react chemically with the surrounding atmosphere when subjected to heat, said method comprising maintaining in the furnace a controlled atmosphere suitable for the material being treated by supplying at least substantially constantly thereto a gas having a controlled composition, passing the gas used for maintaining the controlled atmosphere in the furnace at least substantially continuously from said furnace, storing said gas externally of the furnace in a magazine, and passing such stored gas intermittently to the feed valve for flushing the same.

2. A method according to claim 1 comprising compressing the gas removed from the furnace during its passage to the magazine.

3. A method according to claim 1 comprising evacuating the feed valve prior to flushing the same.

4. A method according to claim 1 further comprising flushing the feed valve with a second, inexpensive gas having a composition less deleterious to the material being treated than air, prior to flushing the valve with the said gas which is removed from the furnace.

5. A furnace system for heating material whose surface tends to react chemically with the surrounding atmosphere when subjected to heat, said system comprising a furnace including at least one gas-flushed lock-type feed valve for locking the material into and out of the furnace, means for controllably and substantially continuously supplying gas to said furnace and means for controllably and intermittently flushing the feed valve with gas, a gas magazine, means for substantially continuously passing gas from the furnace to said gas magazine and means for intermittently passing gas from the magazine to the feed valve to flush the same.

6. A furnace system according to claim 5 further comprising means for compressing the gas removed from the furnace before introduction into said magazine, said magazine being in the form of a pressure vessel.

* * * * *